United States Patent
Saltsidis et al.

(10) Patent No.: US 8,593,945 B2
(45) Date of Patent: *Nov. 26, 2013

(54) CONNECTIVITY FAULT MANAGEMENT TRAFFIC INDICATION EXTENSION

(75) Inventors: Panagiotis Saltsidis, Stockholm (SE); Zhemin Ding, Stockholm (SE); Kevin Nolish, Pittsburgh, PA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/410,665

(22) Filed: Mar. 2, 2012

(65) Prior Publication Data

US 2012/0195191 A1    Aug. 2, 2012

Related U.S. Application Data

(63) Continuation of application No. 12/445,680, filed as application No. PCT/IB2009/005218 on Apr. 13, 2009, now Pat. No. 8,169,896.

(60) Provisional application No. 61/045,302, filed on Apr. 16, 2008.

(51) Int. Cl.
H04L 12/26    (2006.01)

(52) U.S. Cl.
USPC ........................................................ 370/228

(58) Field of Classification Search
USPC .................................. 370/228, 225, 219, 220
See application file for complete search history.

(56) References Cited

U.S. PATENT DOCUMENTS

| | | | |
|---|---|---|---|
| 5,689,244 A | 11/1997 | Iijima et al. | |
| 6,657,970 B1 | 12/2003 | Buckingham et al. | |
| 7,093,027 B1 | 8/2006 | Shabtay et al. | |
| 7,340,515 B2 | 3/2008 | Walker et al. | |
| 7,839,795 B2 | 11/2010 | Felkar et al. | |
| 8,169,896 B2 * | 5/2012 | Saltsidis et al. | 370/228 |
| 2002/0030865 A1 | 3/2002 | Kawate et al. | |
| 2003/0028648 A1 | 2/2003 | Calhoun | |

(Continued)

FOREIGN PATENT DOCUMENTS

| | | |
|---|---|---|
| JP | A 2000-269939 | 9/2000 |
| JP | A 2004-266560 | 9/2004 |

OTHER PUBLICATIONS

Siemens: "Metro Ethernet Deployment With Siemens PBB-TE-Surpass HID 6600" Internet Citation, [Online] No. Version 1.0, pp. 1-14, XP002524312.

(Continued)

Primary Examiner — Mark Rinehart
Assistant Examiner — Mohammad Anwar

(57) ABSTRACT

A method for detecting a mismatch between a first port and a second port includes determining whether a destination address associated with the second port and a virtual local access network identifier (VID) for a service instance monitored by a first maintenance end point are included in a table of the first port. The method further includes setting a traffic field in a first continuity check message. The method additionally includes receiving, at the first maintenance end point, a second continuity check message that includes a traffic field. The method also includes detecting a mismatch when the value of the traffic field in the second continuity check message does not match the value of the traffic field in the first continuity check message.

18 Claims, 6 Drawing Sheets

(56) References Cited

U.S. PATENT DOCUMENTS

| | | |
|---|---|---|
| 2007/0268817 A1 | 11/2007 | Smallegange et al. |
| 2007/0274239 A1 | 11/2007 | Nguyen et al. |
| 2008/0112331 A1 | 5/2008 | Long et al. |
| 2009/0003313 A1 | 1/2009 | Busch et al. |
| 2011/0026397 A1 | 2/2011 | Saltsidis et al. |

OTHER PUBLICATIONS

IEEE, "Standard for Local and Metropolitan Area Networks—Virtual Bridged Local Area Networks AmendmenADt 5: Connectivity Fault Management; IEEE Std 802.1ag" (Amendment to IEEE Std 802.1Q-2005 as amended by IEE Std 802.1ad-2005 and IEE Std 802.1ak-2007), Dec. 17, 2007.

\* cited by examiner

US 8,593,945 B2

CONNECTIVITY FAULT MANAGEMENT TRAFFIC INDICATION EXTENSION

CLAIMING BENEFIT OF PRIOR FILED U.S. APPLICATION

This application is a continuation of International Application PCT/IB2009/005218, with an international filing date of Apr. 13, 2009, which corresponds to the national-stage entry U.S. patent application Ser. No. 12/445,680, filed Apr. 15, 2009 and which claims the benefit of U.S. Provisional Application No. 61/045,302, filed Apr. 16, 2008, and the contents of all of the preceding are hereby incorporated by reference herein.

TECHNICAL FIELD

The present invention relates to communication networks. More specifically, and without limitation, the invention is directed to a Traffic field indicator for use in Connectivity Fault Management (CFM) messages to provide enhanced control of Ethernet Switched Paths (ESPs).

BACKGROUND

Connectivity Fault Management (CFM), as described in IEEE 802.1ag, is a key component of operation, administration, and maintenance for carrier Ethernet. IEEE 802.1ag specifies protocols, procedures, and managed objects for end-to-end fault detection, verification, and isolation. IEEE 802.1ag establishes managed objects, called Maintenance Associations (MAs), to verify the integrity of a single service instance by exchanging CFM messages. The scope of an MA is determined by its Management Domain (MD), which describes a network region where connectivity and performance is managed. Each MA associates two or more Maintenance Association Endpoints (MEPs) and enables Maintenance Association Intermediate Points (MIPs) to support fault detection and isolation.

A continuity check protocol is used for fault detection. Each MEP periodically transmits Connectivity Check Messages (CCMs) and tracks CCMs received from other MEPs in the same maintenance association.

FIG. 1 illustrates the format of an existing CFM Protocol Data Unit (PDU) 10. A common CFM Header consists of a Management Domain (MD) level field 11, Version field 12, OpCode field 13, Flags field 14, and First Time, Length, and Value (TLV) Offset field 15. The Flags field 14 of the Common CFM Header is currently split into three parts:
1. RDI field (one bit, the most significant bit);
2. Reserved field (4 bits); and
3. CCM Interval field (the least significant three bits).

Provider Backbone Bridging-Traffic Engineering (PBB-TE), as described in IEEE 802.1Qay, was designed to provide full traffic engineering of paths in a bridged network. PBB-TE eliminates the need for backbone devices to perform learning and flooding. Instead of using Multiple Spanning Tree Protocol/Rapid Spanning Tree Protocol (MSTP/RSTP) for loop avoidance, PBB-TE uses a management plane or an external control plane to create static filtering table entries in the component bridges.

PBB-TE is a connection-oriented Ethernet technology that uses a statically configured tuple consisting of the Backbone Destination Address (B-DA), Backbone Source Address (B-SA), and Backbone VLAN ID (B-VID) to create a PBB-TE path. The provisioned path is called an Ethernet Switched Path (ESP). Two co-routed point-to-point ESPs with the same Customer Backbone Port (CBP) MAC addresses form a bidirectional MAC service, which is called a point-to-point Traffic Engineering Service Instance (TESI).

PBB-TE supports 1:1 bidirectional path-protection switching. Two point-to-point TESIs are provisioned. One TESI is configured as a "working" TESI and the other as a "protection" TESI. In normal conditions, traffic is transmitted over the working TESI. In the event of either a failure of the working TESI or a specific administrative request, traffic is switched to the protection TESI. Optionally, PBB-TE 1:1 protected paths may be configured to allow for load sharing. In this case, customer services denoted by an I-TAGed frame flow may be present on both TESIs in a protection group.

FIG. 2 illustrates a conventional PBB-TE protection group 20. The protection group includes a working TESI 21, a protection TESI 22, a near end (East B-Component) 23, and a far end (West B-Component) 24. The near end (East B-Component) includes Provider Network Ports (PNPs) 25a and 25b and Customer Backbone Port (CBP) 26. The far end (West B-Component) includes PNPs 27a and 27b and CBP 28. Each TESI is monitored by an independent MA, and each MA has two MEPs. One is located in the CBP 26 of the near end; the other is located in the CBP 28 of the far end. When the near end MEP detects the loss of CCMs, it notifies the far end MEP by sending a CCM with a Remote Defect Indicator (RDI) flag. Both ends are aware of the failure (either by loss of CCMs or receiving the CCM with the RDI flag), so protection switching to the protection TESI is executed on both ends. When the failure is cleared, traffic may be switched back to the working TESI 21 or may stay in the protection TESI 22 according to the configured mode (revertive or non-revertive).

ITU-T G.8031 defines the Automatic Protection Switching (APS) protocol and linear protection switching mechanisms for point-to-point VLAN-based Ethernet Subnetwork connections in Ethernet transport networks. Linear 1+1 and 1:1 protection switching architectures with unidirectional and bidirectional switching are supported.

The current PBB-TE draft (2.0) supports 1:1 bidirectional path protection switching based upon the ITU-T G.8031 model. The differences between PBB-TE protection functionality and ITU-T G.8031 protection functionality are:
  ITU-T G.8031 defines the APS protocol as the signaling Protocol Data Unit (PDU) while PBB-TE re-uses/extends the CCM PDU to avoid the unnecessary complexity of an additional signaling PDU.
  In PBB-TE, an "out-of-band" management system is assumed to coordinate the two ends of the protected service belonging to a single domain.
  In PBB-TE, a protected flow is identified by a TESI while in G.8031 the protected flow is identified by a VLAN ID (VID).

In 1:1 bidirectional protection switching, a mismatch between the bridge/selector positions of the near end 23 and the far end 24 can occur. To maintain the proper operation of the network, this mismatch should be detected and reported to the network operator. Then the network operator can clear the defect. There are two types of mismatch in 1:1 bidirectional protection switching:
  Protection switching incomplete mismatch; and
  Working/protection configuration mismatch.

Still referring to FIG. 2, a scenario is depicted in which a protection switching incomplete mismatch occurs. In this example, due to a hardware malfunction, the near end (East B-Component) 23 fails to switch over, but it sends an RDI to the far end (West B-Component) 24. The far end switches to the protection TESI 22 while the near end is still in the working TESI 21. Similarly, a mismatch can also occur when the near end switches to the protection TESI, but the far end fails to switch when it receives the RDI.

A mismatch can also occur because of a wrong configuration. For example, one end may be configured to send traffic on the working TESI 21 while the other end is configured to send traffic on the protection TESI 22. Similarly, one end may be configured in the revertive mode while the other end is configured in the non-revertive mode. In this case, the mismatch occurs when a failure is cleared.

Based on the existing mechanisms, there are two ways to address the mismatch problem, but both are undesirable in a PBB-TE environment.

First, the APS protocol can be utilized to detect the mismatch (as in G.8031), but this approach is too complicated. In G.8031, the APS protocol is designed for Linear 1+1 and 1:1 protection switching architectures with unidirectional and bidirectional switching. Since PBB-TE only focuses on 1:1 bidirectional protection switching, and PBB-TE already assumes an "out-of-band" management system to coordinate both ends in a single domain, the APS protocol brings a great many duplicated and unnecessary functionalities. In addition, adding the APS protocol to a bridge creates major architecture changes.

FIG. 3 illustrates an example of how a mismatch in 1:1 bidirectional protection switching may be detected by an "out-of-band" Operations Support System/Network Management System (OSS/NMS) 31. Although the mismatch can be detected by using the APS protocol, without APS, the OSS/NMS can be utilized. In step 32, the OSS/NMS requests the selector/bridge position from both the near end (East B-Component) 23 and the far end (West B-Component) 24. At step 33, the near end and far end report their selector/bridge positions to the OSS/NMS. At step 34, the OSS/NMS compares the reported positions to detect a mismatch. For the PBB-TE environment, this process is too slow, and it has the additional disadvantage of having to be initiated proactively by an operator.

SUMMARY

It is desirable to have a simple mechanism based on the existing bridge architecture to constantly monitor the working/protection entities and to immediately and automatically report to an operator if a mismatch occurs. The present invention provides a CCM enhancement based on the existing bridge architecture to solve the mismatch problem. It is fully compliant with the existing standard. In addition, the present invention can be used to adjust the CCM interval to save bandwidth. In certain scenarios, it is also possible to use the invention to provide in-band signaling support for operator requests.

In one embodiment, the present invention utilizes one of the four reserved bits in the Flags field of a CCM to indicate traffic status. For example, the bit may indicate whether the traffic is transmitted in the TESI monitored by these CCMs. This bit is referred to herein as the "Traffic field".

The mismatch is detected by the corresponding MEP when the Traffic field of transmitted CCMs and received CCMs does not match for a predefined period of time (for example, 50 ms or longer). The mismatch defect is cleared when the corresponding MEP receives the first CCM that indicates the dame Traffic field as its transmitted CCMs.

Thus, in one embodiment, the present invention is directed to a method of controlling traffic between a first network element and a second network element connected by a working network path and a protection network path. The method includes the steps of setting a Traffic field in a configuration message sent between the first and second network elements, the Traffic field indicating which network path is being utilized to transport the traffic; receiving the configuration message in one of the network elements; and taking action to control the traffic based upon a value of the Traffic field in the received configuration message. The step of taking action may include comparing the value of the Traffic field in the received configuration message with a value of a Traffic field in configuration messages sent from the receiving network element, and when the Traffic field value in the received configuration message does not match the Traffic field value in configuration messages sent from the receiving network element, moving the traffic from its current path to the other network path. In one embodiment, the traffic is moved only when the Traffic field value in the received configuration message has not matched the Traffic field value in configuration messages sent from the receiving network element for a predefined period of time.

In a particular embodiment, the working network path and the protection network path are bidirectional point-to-point Traffic Engineering Service Instances (TESIs), and the step of setting a Traffic field in a configuration message includes setting a Traffic field in a Connectivity Check Message (CCM) by utilizing a reserved bit within a Flags field as the Traffic field.

By utilizing the Traffic field in CCMs, a MEP may determine the traffic load on the different TESIs. When there is no traffic on a given TESI, the MEP may increase a CCM interval on the given TESI in response. Likewise, if the Traffic field subsequently indicates that traffic has been switched to the given TESI, the MEP may dynamically reduce the CCM interval on the given TESI in response. The MEP may also respond to changes of the value of the Traffic field in received CCMs to move traffic from one TESI to the other in order to balance the traffic between the TESIs. Likewise, the MEP may set the Traffic field in response to an operator request to move traffic from one TESI to another.

In another embodiment, the present invention is directed to a MEP associated with a first Customer Backbone Port for controlling traffic between the first Customer Backbone Port and a second Customer Backbone Port, wherein the Customer Backbone Ports are connected by a working TESI and a protection TESI. The MEP includes means for setting a Traffic field in a first CCM sent from the first Customer Backbone Port to the second Customer Backbone Port, the Traffic field indicating which TESI is being utilized to transport the traffic. The MEP also includes means for Deceiving a second CCM sent from the second Customer Backbone Port; means for determining whether the Traffic field in the second CCM matches the Traffic field in the first CCM; and means for taking action to control the traffic based upon a result obtained from the determining means. The actions taken may include moving traffic from one TESI to another when the Traffic fields do not match. This may be done to balance the traffic load or in response to an operator request. The MEP may also dynamically increase or reduce the CCM interval on the given TESI in response to the traffic load.

BRIEF DESCRIPTION OF THE DRAWINGS

In the following, the essential features of the invention will be described in detail by showing preferred embodiments, with reference to the attached figures in which.

DETAILED DESCRIPTION

Figure 4:
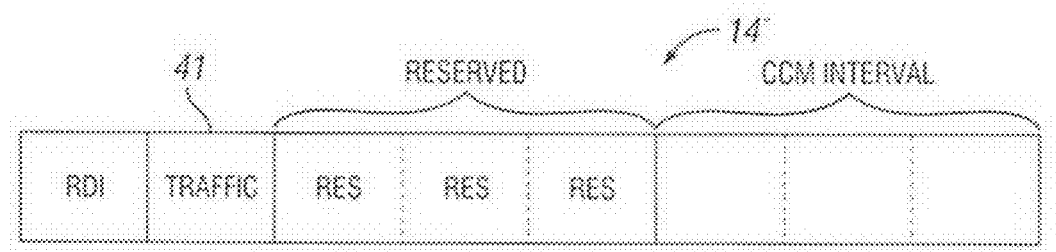
FIG. 4 illustrates the format of a Flags field modified in accordance with one embodiment of the present invention.

FIG. 4 illustrates the format of a Flags field 14' modified in accordance with one embodiment of the present invention. In this embodiment, one of the reserved bits is utilized to indicate traffic status of the monitored path. This bit is referred to herein as the "Traffic field" 41.

Figure 5:
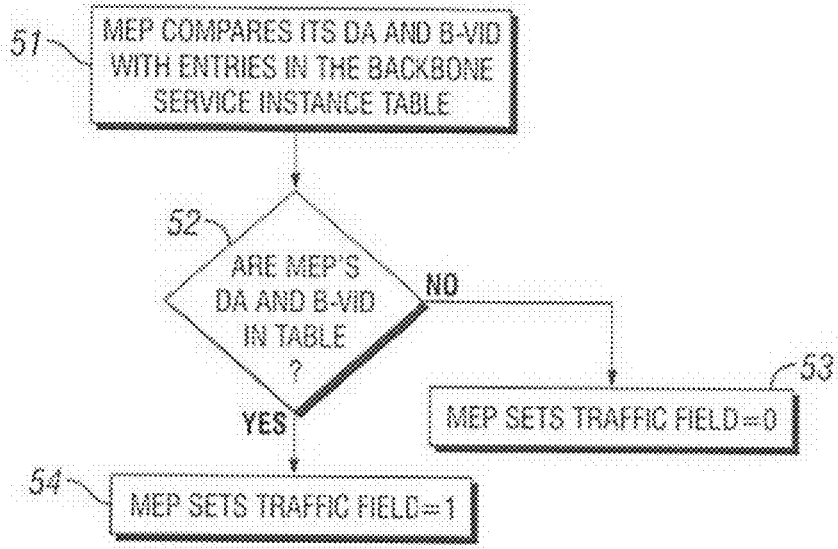
FIG. 5 is a flow chart illustrating the steps of an embodiment of the method of the present invention when CCMs are sent by the MEP.

FIG. 5 is a flow chart illustrating the steps of an embodiment of the method of the present invention when CCMs are sent by the MEP. At step 51, the MEP compares its own destination address and Backbone VLAN ID (B-VID) against the Backbone Destination Address (B-DA) and B-VID entries in the backbone service instance table. At step 52, it is determined whether the MEP's destination address and B-VID are in the backbone service instance table. If not, the method moves to step 53 where the MEP sets the Traffic field of outgoing CCMs to "0". However, if the MEP's destination address and B-VID are in the backbone service instance table, the method moves instead to step 54 where the MEP sets the Traffic field of outgoing CCMs to "1".

Figure 6:
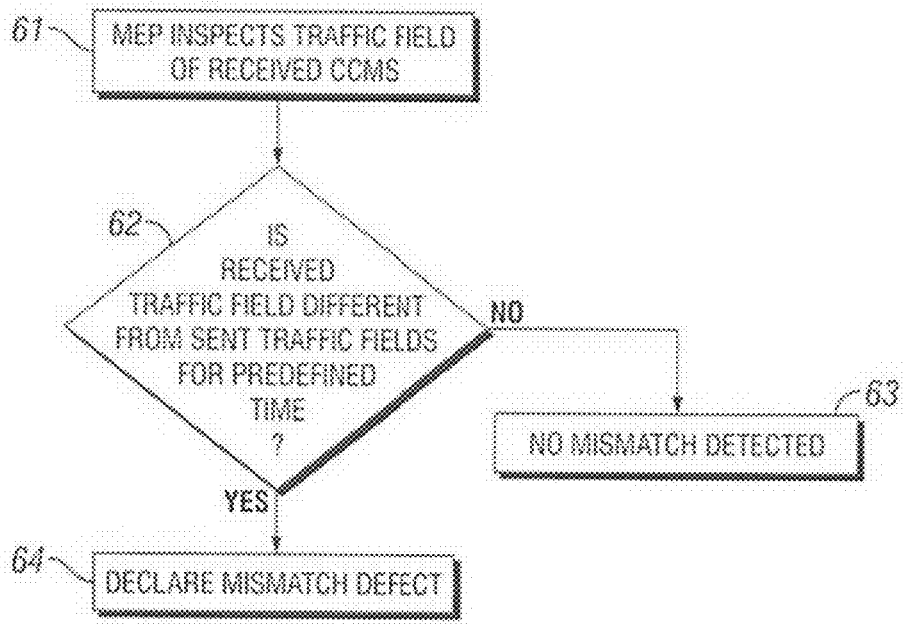
FIG. 6 is a flow chart illustrating the steps of an embodiment of the method of the present invention when CCMs are received by the MEP.

FIG. 6 is a flow chart illustrating the steps of an embodiment of the method of the present invention when CCMs are received by the MEP. At step 61, the MEP inspects the Traffic field 41 of the received CCMs. At step 62, it is determined whether the received Traffic field is different from the Traffic field of CCMs sent by this MEP for at least a predefined period of time (for example, 50 ms). If not, the method moves to step 63 where no mismatch is detected. However, if the received Traffic field is different from the Traffic field of CCMs sent by this MEP for at least the predefined period of time, the method moves instead to step 64 where a mismatch defect is declared.

There are additional applications of the Traffic field 41 in CCM messaging. For example, the Traffic field may be utilized to provide an adaptive CCM interval. Ethernet OAM provides a mechanism for checking connectivity in a provider network by transmission of CCM frames at a specified interval. A smaller interval reduces the time to detect a connectivity failure but does so at the expense of a greater fraction of overhead CCM traffic. By using the new Traffic field 41, MEPs on either the working TESI 21 or the protection TESI 22 are kept informed of the traffic status.

Figure 7:
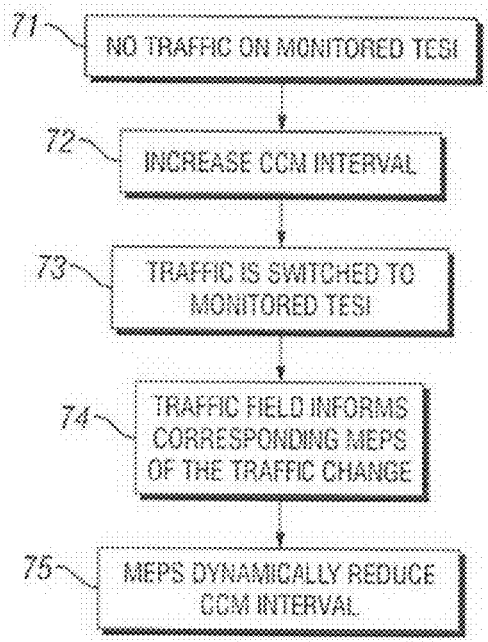
FIG. 7 is a flow chart illustrating the steps of an embodiment of the method of the present invention for providing an adaptive CCM interval.

FIG. 7 is a flow chart illustrating the steps of an embodiment of the method of the present invention for providing an adaptive CCM interval. At step 71, there is no traffic on the TESI monitored by the CCMs. Therefore, at step 72, the CCM interval is increased to save bandwidth. At step 73, the traffic is switched to the monitored TESI. At step 74, the corresponding MEPs are informed of the traffic change by the Traffic field 41. At step 75, the MEPs dynamically reduce the CCM interval.

The Traffic field 41 can also be used for in-band signaling of administrative commands. The protection switching mechanism must allow for manual operation by the network operator regardless of the network state. Similar to mismatch detection, there are two choices for disseminating administrative commands from network operators. First, the APS protocol can be used, but as discussed above, APS is complicated and redundant for PBB-TE. Second, a management system can be utilized (e.g., OMS/NMS) to notify both ends of a PBB-TE service instance. In certain scenarios, however, operator requests may originate from a single end such as a Network Element (NE) or Element Management System (EMS). The present invention provides a convenient way to propagate operator requests to the other end.

Figure 8:
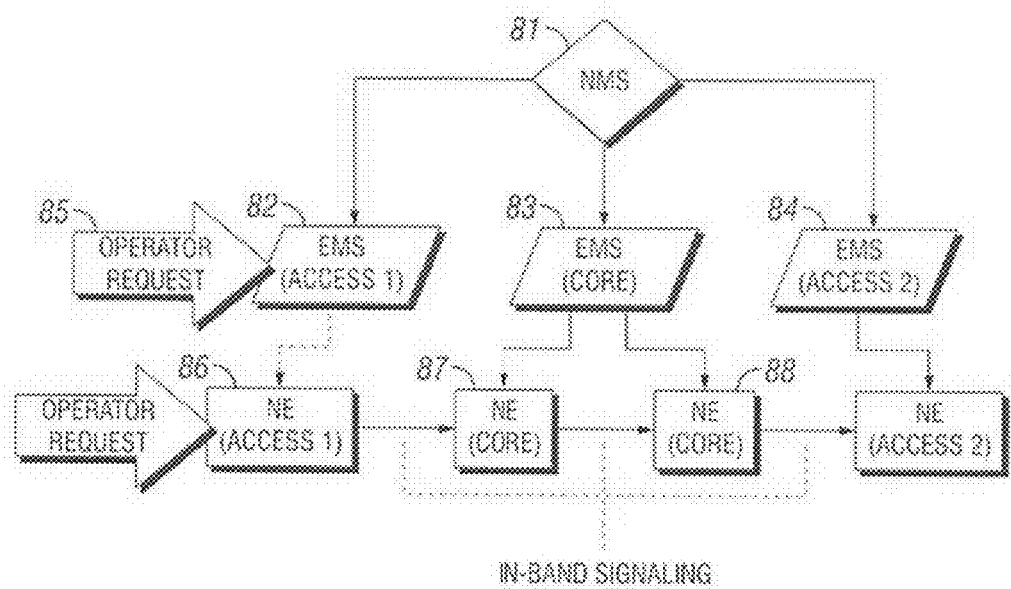
FIG. 8 (Prior Art) illustrates an existing scenario in which an operator request can only be sent to the NE/EMS at one end of a protected PBB-TE service instance.

FIG. 8 illustrates an existing scenario in which an operator request can only be sent to the NE/EMS at one end of a protected PBB-TE service instance. An NMS 81 controls EMS 82 in access network 1. EMS 83 in the core network, and EMS 84 in access network 2. An operator request 85 may be received in EMS 82 in access network 1. EMS 82 controls NE 86 to forward the operator request toward the core NEs 87 and 88. In order to coordinate the switching of the other end, the operator request must be communicated in-band over the PBB-TE service instance, thus decreasing available bandwidth.

Figure 9:
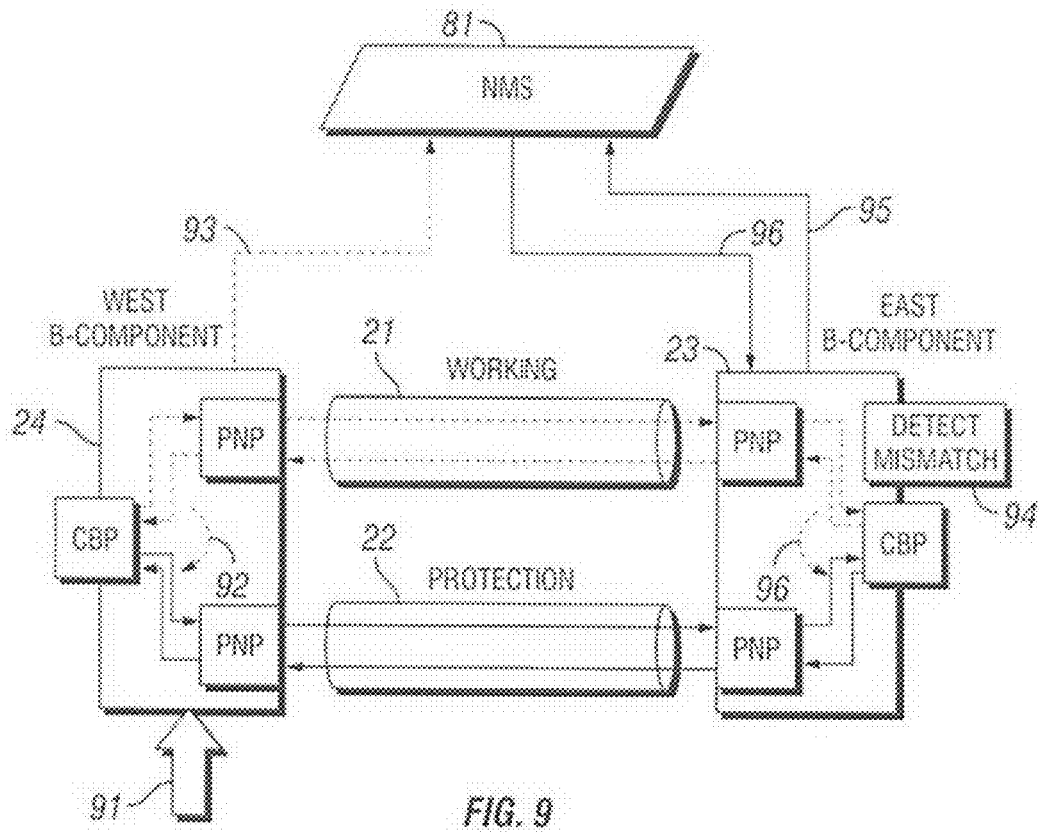
FIG. 9 illustrates an embodiment of the method of the present invention for providing in-band signaling support for an administrative command.

FIG. 9 illustrates an embodiment of the method of the present invention for providing in-band signaling support for an administrative command. In this embodiment, the new Traffic field 41 is utilized for in-band signaling of the operator request over the PBB-TE protection group. In this example, the command is for manual switching from the working TESI to the protection TESI.

At step 91, an operator request called "manual switching from working to protection" is sent to the far end of the protected PBB-TE service instance (West B-Component) 24. At step 92, the far end West B-Component switches traffic from the working TESI 21 to the protection TESI 22 and changes the Traffic field 41. At step 93, the far end reports its state to the NMS. At step 94, the near end (East B-Component) 23 detects a mismatch in the Traffic field 41 of received CCMs. At step 95, the near end (East B-Component) reports the defect of mismatch to the NMS and at step 96, the NMS notifies the near end (East B-Component) 23 of its state. The near end then switches traffic from the working TESI 21 to the protection TESI 22. Note in this example that the near end cannot tell whether the mismatch was due to an operator's request for a manual switch, a forced switch, or a mismatch defect. So the near end has to gel its state information from the NMS.

Figure 10:
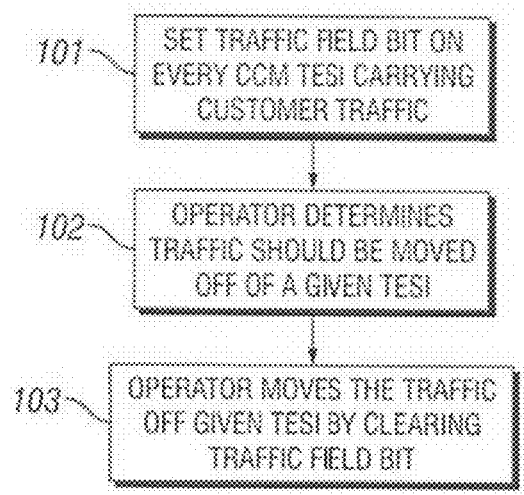
FIG. 10 is a flow chart illustrating the steps of an embodiment of the method of the present invention for supporting load sharing.

FIG. 10 is a flow chart illustrating the steps of an embodiment of the method of the present invention for supporting load sharing. At step 101, the Traffic field bit 41 is set on every CCM TESI that is carrying customer traffic. At step 102 an operator determines that traffic should be moved off of a given TESI. At step 103, the operator moves the traffic off of the given TESI simply by clearing the Traffic field bit.

Figure 1:
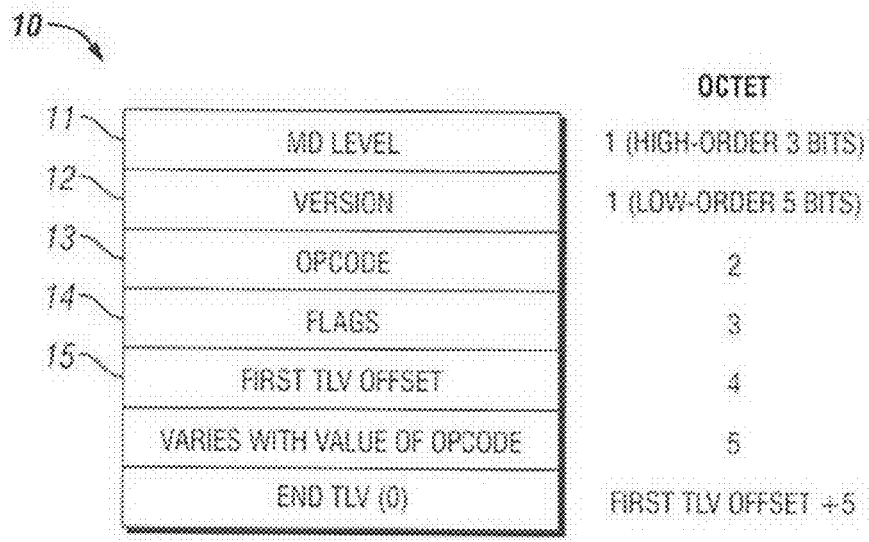
FIG. 1 (Prior Art) illustrates the format of an existing CFM Protocol Data Unit (PDU)
Figure 2:
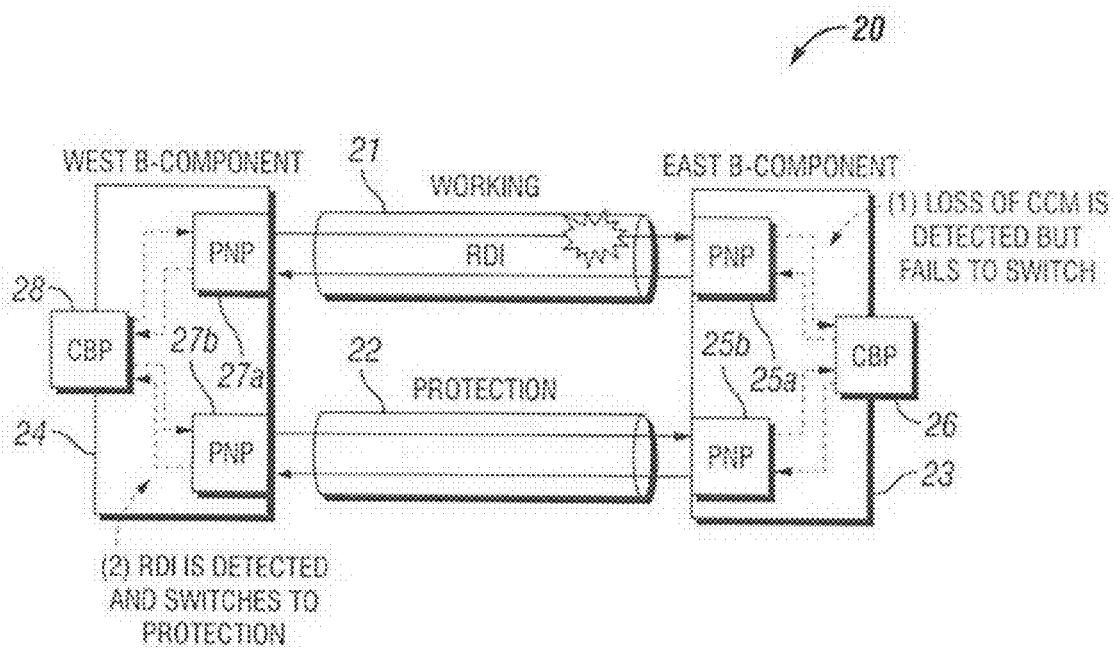
FIG. 2 (Prior Art) illustrates an existing PBB-TE protection group.
Figure 3:
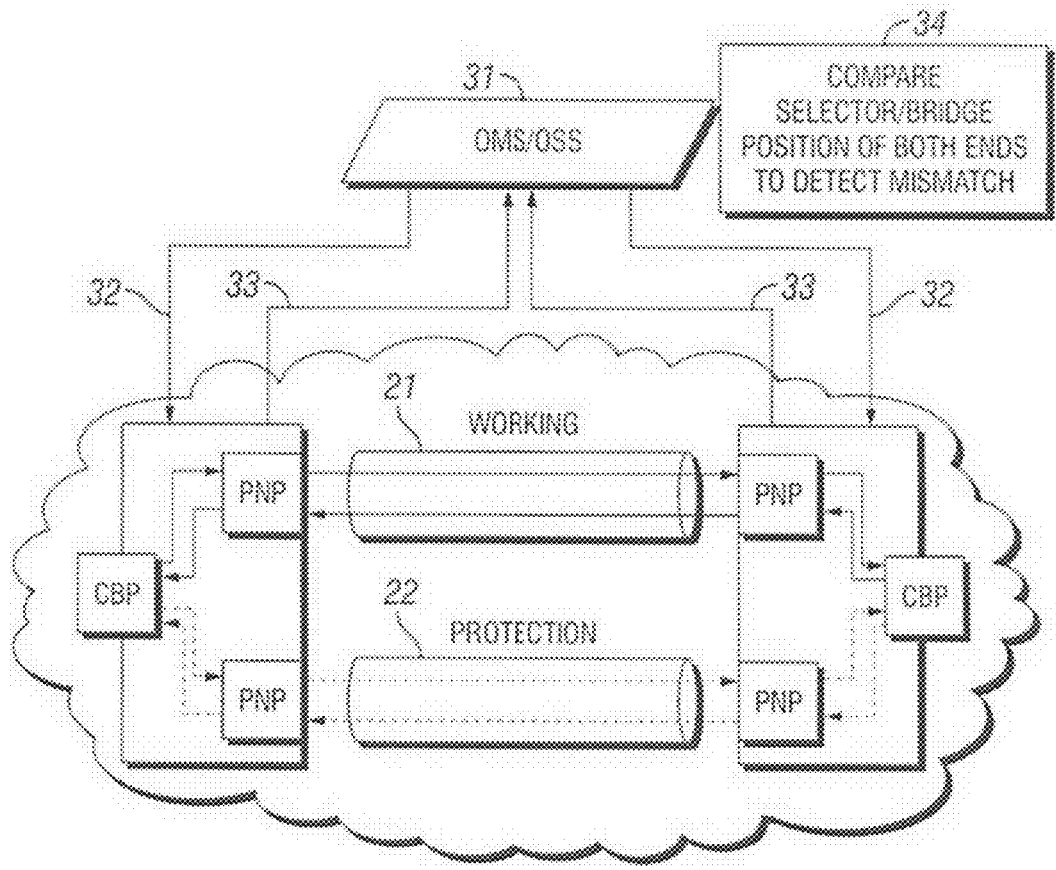
FIG. 3 (Prior Art) illustrates an example of how a mismatch in 1:1 bidirectional protection switching may be detected by an "out-of-band" Operations Support System/Network Management System (OSS/NMS)
Figure 11:
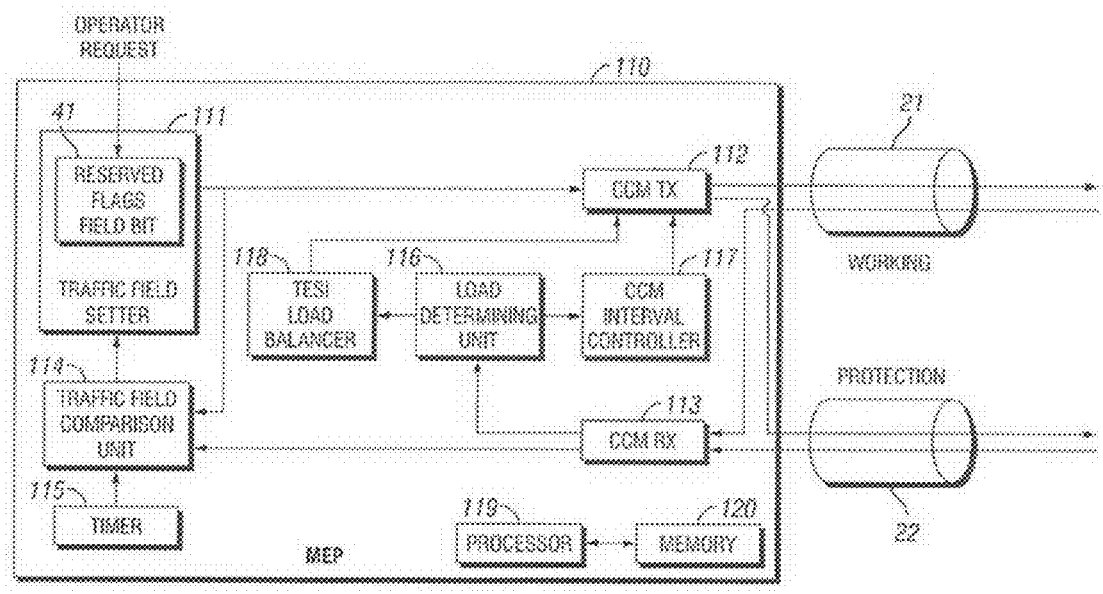
FIG. 11 is a simplified block diagram of a MEP in an embodiment of the present invention.

FIG. 11 is a simplified block diagram of a MEP 110 in an embodiment of the present invention. The MEP is associated with a Customer Backbone Port (CBP) such as CBP 26 or CBP 28 in FIG. 1. The MEP monitors traffic between its associated CBP and another CBP connected by a working TESI 21 and a protection TESI 22. The MEP includes a Traffic field setter 111 for setting the Traffic field in CCMs to be sent by a CCM transmitter 112. The Traffic field may be set by setting the reserved bit 41 (FIG. 4) in the Flags field of the CCM. A CCM receiver 113 receives CCMs sent from the other CBP, and a Traffic field comparison unit 114 compares the Traffic field in sent CCMs with the Traffic field in received CCMs to determine whether the Traffic fields match.

When the Traffic field in received CCMs matches the Traffic field in sent CCMs, the MEP continues to send the traffic on its current TESI. When the Traffic field in received CCMs does not match the Traffic field in sent CCMs, the MEP may declare a mismatch defect and move the traffic accordingly. In one embodiment, the MEP includes a timer 115, and the traffic is moved only when the timer indicates that the Traffic field in received CCMs has not matched the Traffic field value in sent CCMs for a predefined period of time.

The MEP may also include a load determining unit 116 for determining the traffic load on each TESI 21 and 22. If a given TESI has no traffic, a CCM interval controller 117 may increase the CCM interval on the given TESI in response. Subsequently, the load determining unit may detect from the Traffic field in received CCMs that traffic has been switched to the given TESI. In response, the CCM interval controller may dynamically reduce the CCM interval on the given TESI.

In another embodiment, the load determining unit 116 may report the traffic load on each TESI 21 and 22 to a TESI load balancer 118. The TESI load balancer moves traffic from one TESI to the other in order to balance the traffic between the TESIs.

The MEP 110 may also receive operator requests to control the traffic. The requests are sent to the Traffic field setter 111, which changes the Traffic field in outgoing CCMs to a value corresponding to the operator request. The other CBP receives the CCMs and responds to the Traffic field.

Note also that the Traffic field bit 41 may be used on CCM messages at the Service ID (I-SID) level to allow for cross-checking and switching at a per-customer service level.

The operations of the MEP may be controlled by a processor 119 running computer program instructions stored on a memory 120.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention as defined by the following claims.

The invention claimed is:

1. A method of detecting a mismatch between a first port associated with a first maintenance end point and a second port associated with a second maintenance end point, wherein the first port and the second port are connected by at least one service instance, the method comprising:
   determining whether a destination address associated with the second port and a virtual local access network identifier (VID) for a service instance monitored by the first maintenance end point are included in a table of the first port;
   setting a traffic field in a first continuity check message sent from the first maintenance end point to the second maintenance end point based on whether the destination address associated with the second port and the VID for the monitored service instance are included in the table of the first port;
   receiving, at the first maintenance end point, a second continuity check message sent from the second maintenance end point, wherein the second continuity check message includes a traffic field indicating whether a destination address associated with the first port and the VID for the monitored service instance are included in a table of the second port;
   determining whether a value of the traffic field in the second continuity check message matches a value of the traffic field in the first continuity check message; and
   detecting a mismatch when the value of the traffic field in the second continuity check message does not match the value of the traffic field in the first continuity check message.

2. The method of claim 1, further comprising:
   when the value of the traffic field in the second continuity check message matches the value of the traffic field in the first continuity check message, continuing to send traffic from the first port on a current service instance; and
   when the value of the traffic field in the second continuity check message does not match the value of the traffic field in the first continuity check message, moving the traffic from the current service instance to another service instance.

3. The method of claim 2, wherein moving the traffic to another service instance includes moving the traffic only when the value of the traffic field value in the second continuity check message has not matched the value of the traffic field value in a plurality of continuity check messages sent from the first port for a predefined period of time.

4. The method of claim 1, wherein setting the traffic field in the first continuity check message includes utilizing a reserved bit within a flag field as the traffic field.

5. The method of claim 1, further comprising:
   determining from the mismatch there is no traffic on an identified one of the service instances; and
   increasing a continuity check message interval on the identified service instance, wherein the continuity check message interval is a specified interval for periodic transmission of continuity check messages.

6. The method of claim 5, further comprising:
   detecting from the traffic field that traffic has been switched to the identified service instance; and
   reducing the continuity check message interval on the identified service instance in response to detecting that traffic has been switched to the identified service instance.

7. The method of claim 1, further comprising responding to changes in the value of the traffic field in received continuity check messages to move traffic from one service instance to another service instance in order to balance the traffic between the service instances.

8. The method of claim 1, wherein setting the traffic field includes setting the traffic field in response to receiving an operator request at the first or second port.

9. The method of claim 1, wherein the first port comprises a Customer Backbone Port and the table of the first port comprises a backbone service instance table.

10. An apparatus for managing traffic within a network, the apparatus comprising:
a first maintenance end point, the first maintenance end point comprising:
a first port configured to couple to a network and to communicate with a second port on a second maintenance end point in the network;
a memory configured to store a table of a first port; and
a processor configured to:
determine whether a destination address associated with the second port and a virtual local access network identifier (VID) for a service instance monitored by the first maintenance end point are included in the table of the first port;
set a traffic field in a first continuity check message sent to the second maintenance end point based on whether the destination address associated with the second port and the VID for the monitored service instance are included in the table of the first port;
receive a second continuity check message sent from the second maintenance end point, wherein the second continuity check message includes a traffic field indicating whether a destination address associated with the first port and the VID for the monitored service instance are included in a table of the second port;
determining whether a value of the traffic field in the second continuity check message matches a value of the traffic field in the first continuity check message; and
detecting a mismatch when the value of the traffic field in the second continuity check message does not match the value of the traffic field in the first continuity check message.

11. The apparatus of claim 10, wherein the processor is further configured to:
continue sending traffic from the first port on a current service instance when the value of the traffic field in the second continuity check message matches the value of the traffic field in the first continuity check message; and
move the traffic from the current service instance to another service instance when the value of the traffic field in the second continuity check message does not match the value of the traffic field in the first continuity check message.

12. The apparatus of claim 11, wherein the processor is configured to move the traffic to another service instance by moving the traffic only when the value of the traffic field value in the second continuity check message has not matched the value of the traffic field value in a plurality of continuity check messages sent from the first port for a predefined period of time.

13. The apparatus of claim 10, wherein the processor is configured to set the traffic field in the first continuity check message by utilizing a reserved bit within a flag field as the traffic field.

14. The apparatus of claim 10, wherein the processor is further configured to:
determine from the mismatch there is no traffic on an identified one of the service instances; and
increase a continuity check message interval on the identified service instance, wherein the continuity check message interval is a specified interval for periodic transmission of continuity check messages.

15. The apparatus of claim 14, wherein the processor is further configured to:
detect from the traffic field that traffic has been switched to the identified service instance; and
reduce the continuity check message interval on the identified service instance in response to detecting that traffic has been switched to the identified service instance.

16. The apparatus of claim 10, wherein the processor is further configured to respond to changes in the value of the traffic field in received continuity check messages by moving traffic from one service instance to another service instance in order to balance the traffic between the service instances.

17. The apparatus of claim 10, wherein the processor is further configured to set the traffic field by setting the traffic field in response to receiving an operator request at the first or second port.

18. The apparatus of claim 10, wherein the first port comprises a Customer Backbone Port and the table of the first port comprises a backbone service instance table.

* * * * *

UNITED STATES PATENT AND TRADEMARK OFFICE
CERTIFICATE OF CORRECTION

PATENT NO. : 8,593,945 B2
APPLICATION NO. : 13/410665
DATED : November 26, 2013
INVENTOR(S) : Saltsidis et al.

It is certified that error appears in the above-identified patent and that said Letters Patent is hereby corrected as shown below:

In the Specification

In Column 3, Line 63, delete "dame" and insert -- same --, therefor.

In Column 4, Line 49, delete "Deceiving" and insert -- receiving --, therefor.

Signed and Sealed this
Twenty-ninth Day of July, 2014

Michelle K. Lee
*Deputy Director of the United States Patent and Trademark Office*